US007048253B2

(12) United States Patent
Stier

(10) Patent No.: US 7,048,253 B2
(45) Date of Patent: May 23, 2006

(54) FUEL INJECTION

(75) Inventor: Hubert Stier, Asperg (DE)

(73) Assignee: Robert Bosch GmbH, Stuttgart (DE)

(*) Notice: Subject to any disclaimer, the term of this patent is extended or adjusted under 35 U.S.C. 154(b) by 181 days.

(21) Appl. No.: 10/363,837

(22) PCT Filed: May 7, 2002

(86) PCT No.: PCT/DE02/01634

§ 371 (c)(1),
(2), (4) Date: Aug. 1, 2003

(87) PCT Pub. No.: WO03/006819

PCT Pub. Date: Jan. 23, 2003

(65) Prior Publication Data

US 2004/0026646 A1 Feb. 12, 2004

(30) Foreign Application Priority Data

Jul. 9, 2001 (DE) ................................ 101 33 263

(51) Int. Cl.
*F16K 31/02* (2006.01)

(52) U.S. Cl. .................. 251/129.21; 277/412; 277/614

(58) Field of Classification Search ........... 251/129.21, 251/129.15; 277/412, 614
See application file for complete search history.

(56) References Cited

U.S. PATENT DOCUMENTS

| | | | |
|---|---|---|---|
| 3,797,756 A * | 3/1974 | Voit et al. | 251/129.22 |
| 3,912,284 A | 10/1975 | Gosling et al. | |
| 5,725,289 A * | 3/1998 | Mueller et al. | 251/129.02 |
| 5,975,654 A * | 11/1999 | Zaviska et al. | 251/129.02 |
| 6,076,802 A | 6/2000 | Maier | |
| 6,299,079 B1 * | 10/2001 | Noller et al. | 251/129.15 |

FOREIGN PATENT DOCUMENTS

| | | |
|---|---|---|
| DE | 39 04 718 | 8/1990 |
| DE | 198 08 068 | 9/1999 |
| DE | 198 49 210 | 4/2000 |
| GB | 1 439 258 | 6/1976 |
| JP | 10 159675 | 9/1998 |
| WO | WO 99/66196 | * 12/1999 |

* cited by examiner

*Primary Examiner*—John Bastianelli
(74) *Attorney, Agent, or Firm*—Kenyon & Kenyon

(57) ABSTRACT

A fuel injector for fuel-injection systems of internal combustion engines has a nozzle body and a magnetic coil positioned in a magnetic cup, the magnetic coil being penetrated by the nozzle body; and a plastic coating which at least partially surrounds the nozzle body. The nozzle body and the magnetic cup are sealed from an environment of the fuel injector by a thread-type labyrinth seal.

4 Claims, 1 Drawing Sheet

FUEL INJECTION

BACKGROUND INFORMATION

From German Patent Application No. DE 198 49 210, for example, a fuel injector is known which has a nozzle body that has a tubular design at its downstream side, and at whose downstream end a sealing seat and a discharge orifice are located. The tubular section of the nozzle body can be inserted into a receiving bore of a cylinder head. The nozzle body is sealed from the receiving bore of the cylinder head, which has a diameter that corresponds to the radial extension of the nozzle body, by a seal having approximately the geometry of a hollow cylinder.

For fixing the seal in position on the nozzle body, the nozzle body is provided with a circumferential groove into which the seal is inserted, the groove being introduced, for example, by desurfacing the nozzle body. To be used as materials are elastic materials which, for installation in the groove, can be slipped over the nozzle body.

Moreover, from German Patent Application No. DE 198 08 068, as well, a fuel injector is known in which a sealing element is positioned on the nozzle body. The seal is made of a metallic material and expands in the radial direction under the influence of the temperature generated by the combustion process. This may be achieved either by a shape-memory alloy or by the use of a bi-metal seal. As in German Patent Application No. DE 198 49 210, a groove in the nozzle body may be used for the fixation.

During operation of the internal combustion engine, the metal sealing ring heats up and expands, thereby increasing the sealing effect during operation. To facilitate the installation, the metal seal has a slightly smaller diameter than the receiving bore introduced in the cylinder head for the fuel injector.

A primary disadvantage of the sealing approach proposed in German Patent Application No. DE 198 49 210 is the high temperature to which the seal is exposed. Especially in directly injecting internal combustion engines a high-speed resistance of non-metallic sealing materials cannot be ensured.

The fuel injector described in German Patent Application No. DE 198 08 068 has the disadvantage that the sealing effect of the metallic seal is temperature-dependent. Following a cold start of the internal combustion engine, some time elapses before the combustion process heats up the materials in the vicinity of the combustion chamber to such a degree that, due to heat conduction, the temperature leading to the required deformation is achieved in the seal. For this reason, another seal is required, in addition to the mentioned seal, in order to seal the combustion chamber from the external space at the start of operation of the internal combustion, in order not to lose any compression pressure.

Also disadvantageous are the costly materials that are used in the production of metal seals that deform as a function of temperature. A shape-memory alloy has a transition temperature that is adapted to the intended application. In order to reliably ensure this transition temperature, a narrow range is often required for the manufacturing process. This not only causes an increase in the development costs for the alloy but also raises the cost when used in series production.

The use of a bimetal seal requires the seal to be affixed on the nozzle body which serves as a counter bearing in the deformation. However, installing the bimetal in a groove, for instance, is difficult since the properties of the material change when one of the two metals undergoes non-elastic deformation during installation.

SUMMARY OF THE INVENTION

The fuel injector according to the present invention has the advantage over the related art that the nozzle body and a magnetic cup in which the magnetic circuit of the fuel injector is encapsulated, are sealed from an environment of the fuel injector by a thread-type labyrinth seal.

The labyrinth seal advantageously has two to three threads which have a radial amplitude of approximately 0.5 mm so as to obtain a reliable sealing effect.

Furthermore, it is advantageous that the labyrinth seal is able to be produced in a simple manufacturing process, using a threading tool or an internal mandrel, without reworking by cutting being required.

An additional advantage is that the form of the thread is not limited to round cross sections but may be produced as desired in an elliptical form or as an oval.

DETAILED DESCRIPTION

Figure 1:
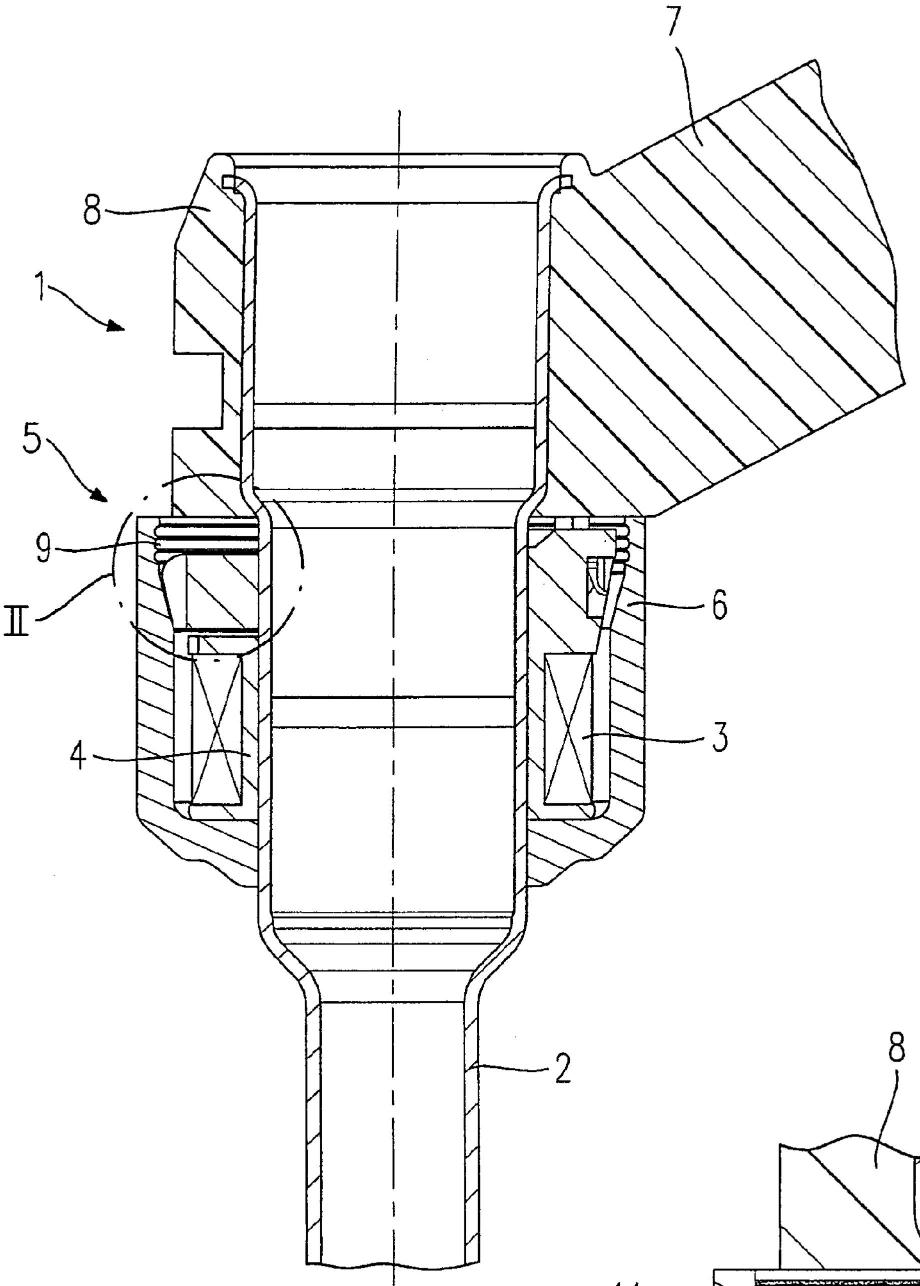
FIG. 1 shows a schematic part-sectional view through an exemplary embodiment of a fuel injector configured according to the present invention.

A fuel injector 1, represented in FIG. 1, is configured in the form of a fuel injector for fuel-injection systems of mixture-compressing internal combustion engines with externally supplied ignition. Fuel injector 1 is particularly suited for the direct injection of fuel into a combustion chamber (not shown) of an internal combustion engine.

Fuel injector 1 includes a sleeve-shaped nozzle body 2 in which, for instance, a valve needle (not shown further) may be positioned. Fuel injector 1 in the exemplary embodiment is an electromagnetically actuated fuel injector. Nozzle body 2 penetrates a magnetic coil 3 which is wound onto a coil brace 4. Magnetic coil 3 is encapsulated in a magnetic cup 6 which is sealed from a surrounding of fuel injector 1 by a labyrinth seal 5 configured according to the present invention.

Figure 2:
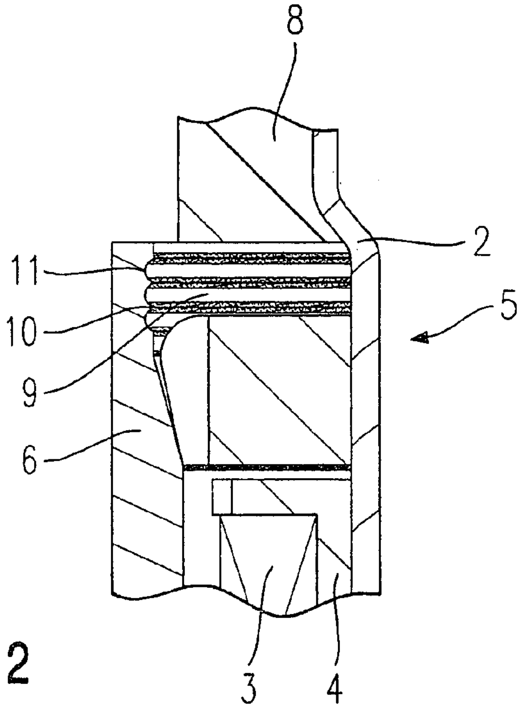
FIG. 2 shows a cutout from the exemplary embodiment, represented in FIG. 1, of a fuel injector 1 configured according to the present invention, in area 11 in FIG. 1.

A detailed representation of labyrinth seal 5 of fuel injector 1 configured according to the present invention may be gathered from FIG. 2 and the following description.

Magnetic coil 3 is energized via an electric line (not shown further) by an electric current, which may be supplied via an electrical plug contact 7. A plastic coating 8, which may be extruded onto nozzle body 2, encloses plug contact 17.

FIG. 2, in a part-sectional view, shows the area designated 11 in FIG. 1, from the exemplary embodiment of a fuel injector 1 designed according to the present invention, as represented in FIG. 1.

As already mentioned, magnetic coil 3 and nozzle body 2 of fuel injector 1 configured according to the present invention are provided with a labyrinth seal 5 which seals the components enveloped by plastic coating 8 from the environment of fuel injector 1 and, thus, protects them from dirt and salt water, for example.

Labyrinth seal 5 has a threaded design and includes at least two, but better three thread grooves 9. A radial distance between a low point 10 of each thread groove 9 and a high point 11 of each thread groove should amount to at least 0.5 mm.

The form of the thread may be arbitrary. Easiest to produce is a round thread, but elliptical cross sections are also conceivable.

Labyrinth seal 5 is inserted in order to protect the region surrounded by plastic coating 8, including nozzle body 2, from aggressive media in the vicinity of fuel injector 1. A labyrinth seal 5, having a thread-type design as in fuel injector 1 according to the present invention, allows for a rotary release of the tool that produces labyrinth seal 5, thereby dispensing with reworking, and simplifying the production process which becomes less cost-intensive as a result.

Labyrinth seal 5 is able to be produced, for instance, by deep-drawing or extruding, thread grooves 9 being produced by a thread-cutting tool. A thread-type labyrinth seal 5 may also be formed by rotary swaging or round kneading with the aid of a thread-type internal mandrel.

The present invention is not restricted to the exemplary embodiment of a fuel injector 1 configured according to the present invention as shown, but is suited for various design of fuel injectors 1.

What is claimed is:

1. A fuel injector for a fuel-injection system of an internal combustion engine, comprising:

a magnetic cup;

a magnetic coil situated in the magnetic cup;

a nozzle body penetrating the magnetic coil;

a plastic coating at least partially surrounding the nozzle body; and a thread-type labyrinth seal, wherein:

the magnetic coil and the nozzle body are provided with the seal, the seal seals components enveloped by the plastic coating from an environment of the fuel injector, and the seal includes at least three thread grooves having a radial amplitude of approximately 0.5 mm.

2. The fuel injector according to claim 1, wherein the seal is made by one of deep-drawing, extruding and rotary swaging.

3. The fuel injector according to claim 1, wherein the thread grooves are made by one of a thread-cutting tool and a thread-type internal mandrel.

4. The fuel injector according to claim 1, wherein the thread grooves have one of a round, an oval and an elliptical cross section.

* * * * *